United States Patent [19]

Turner et al.

[11] Patent Number: 4,893,040

[45] Date of Patent: Jan. 9, 1990

[54] DYNAMO-ELECTRIC MACHINES

[75] Inventors: Alan B. Turner; Toshiyuki Kondo; Katsuhiro Mori, all of East Sussex, United Kingdom

[73] Assignee: Aisin Seiki Kabushiki Kaisha, Kariya, Japan

[21] Appl. No.: 190,386

[22] Filed: May 5, 1988

[30] Foreign Application Priority Data

| May 8, 1987 | [GB] | United Kingdom | 8710991 |
| May 8, 1987 | [GB] | United Kingdom | 8710989 |
| May 8, 1987 | [GB] | United Kingdom | 8710990 |
| May 14, 1987 | [GB] | United Kingdom | 8711389 |

[51] Int. Cl.$^4$ ............................................ H02K 21/12
[52] U.S. Cl. ..................................... 310/156; 310/262
[58] Field of Search ............... 310/156, 261, 262, 264, 310/265, 267, 268

[56] References Cited

U.S. PATENT DOCUMENTS

| 4,117,360 | 9/1978 | Richter | 310/156 |
| 4,433,261 | 2/1984 | Nashiki et al. | 310/156 |
| 4,562,399 | 12/1985 | Fisher | 310/156 |
| 4,674,178 | 6/1987 | Patel | 310/156 |
| 4,742,259 | 5/1988 | Schaefer et al. | 310/156 |
| 4,748,359 | 5/1988 | Yahara et al. | 310/156 |

Primary Examiner—Patrick R. Salce
Assistant Examiner—Kristine Peckman
Attorney, Agent, or Firm—Burns, Doane, Swecker & Mathis

[57] ABSTRACT

A rotating part for a high speed synchronous generator comprises a core of magnetic material, side walls of nonmagnetic material, and an outer circumferential portion. The outer circumferential portion is provided on its outside with an inner layer, an inner retaining ring, an outer layer and an outer retaining ring. The inner and outer layers are made up of magnetic and nonmagnetic portions. The retaining rings are of magnetic material. The greater strength and lighten weight of the nonmagnetic portions reduces the centrifugal forces on the magnetic portions. In an alternative embodiment, the outer circumferential portion comprises a number of layers comprising alternate portions of magnetic and nonmagnetic material, retained by rings of magnetic material. The nonmagnetic portions support the magnetic material, and prevent it from damage through centrifugal force. Another alternative embodiment includes recesses in the outer retaining ring and a nommagnetic material disposed in said recesses for securing the retaining ring. Another alternative embodiment comprises a magnetic core, a nomagnetic side wall of high strength, a magnetic portion, and a retaining ring divided into magnetic parts and nonmagnetic parts.

18 Claims, 9 Drawing Sheets

DYNAMO-ELECTRIC MACHINES

BACKGROUND OF THE INVENTION

1. Field of the Invention

The present invention relates to rotating parts for high speed dynamo-electric machines, such as electric power generators and motors.

2. Description of Related Art

The speed of rotating parts of dynamo-electric machines has been limited due to the low tensile strength of the permanent magnetic materials used therein. Such limitations are caused by the fact that tensile stresses induced by centrifugal forces at high speeds may exceed the structural limit permitted for such materials.

SUMMARY OF THE INVENTION

According to a first preferred embodiment of the present invention, there is provided a rotating part for a dynamo-electric machine that comprises an annular permanent magnet and a retaining ring of a high strength magnetic alloy for securing the annular permanent magnet against contrifugal forces. The rotating part also includes a core portion of magnetic material inside the annular permanent magnet and side walls made of a nonmagnetic material. The annular permanent magnet may comprise a plurality of annular permanent magnet rings provided side by side along an axial direction with such rings being separated by annular nonmagnetic rings. More than one such layer of permanent magnet rings may be provided, and if the magnets in both layers are separated by nonmagnetic rings, the nonmagnetic rings should be equidistantly spaced along the axis of the rotating part, so that the forces on the retaining rings securing the magnets are transferred through the nonmagnetic rings.

In a rotating part of a second preferred embodiment of the prevent invention the retaining ring surrounding the annular permanent magnet has an outer circumferential recess therein, and a nonmagnetic material is disposed in the recess for securing the retaining ring about the annular permanent magnet.

The rotating part according to a third preferred embodiment includes an outer circumferential portion made of a high strength magnetic alloy and which has an outer circumferential recess therein. A nonmagnetic material is disposed in the recess for providing additional support to the outer circumferential portion against centrifugal forces. The third preferred embodiment does not include the layers of permanent magnet rings that are axially separated by nonmagnetic rings. However, the third preferred embodiment may include a plurality of layers of the outer circumferential portion having circumferential recesses therein.

According to a fourth preferred embodiment of the present invention, there is provided a rotating part for a dynamo-electric machine that includes an annular permanent magnet portion and a retaining ring of a high strength magnetic alloy that is circumferentially mounted on the annular permanent magnet portion. The retaining ring is provided with magnetic and nonmagnetic parts. Like the first three preferred embodiments, the rotating part of the fourth preferred embodiment also includes a core made of a magnetic material and side walls made of a nonmagnetic material.

The rotating part of each of the above-mentioned preferred embodiments enables a dynamo-electric machine to be made in a small size and of a light weight, so that the machine is efficient and suitable for high speed operation. For example, a high speed generator constructed with a rotating part according to the present invention can be connected directly to a high speed gas turbine without the need for a gear box to decrease the rotational speed of the generator. Thus, the power loss that might otherwise result from such a reduction in speed caused by such a gear box is avoided.

In addition, in accordance with the present invention an outer circumferential portion of the rotating part includes an exposed magnetic portion, so that the clearance between the outer circumferential portion and a stator can be small, thus improving the generating efficiency of the generator.

DESCRIPTION OF THE PREFERRED EMBODIMENTS

Figure 1:
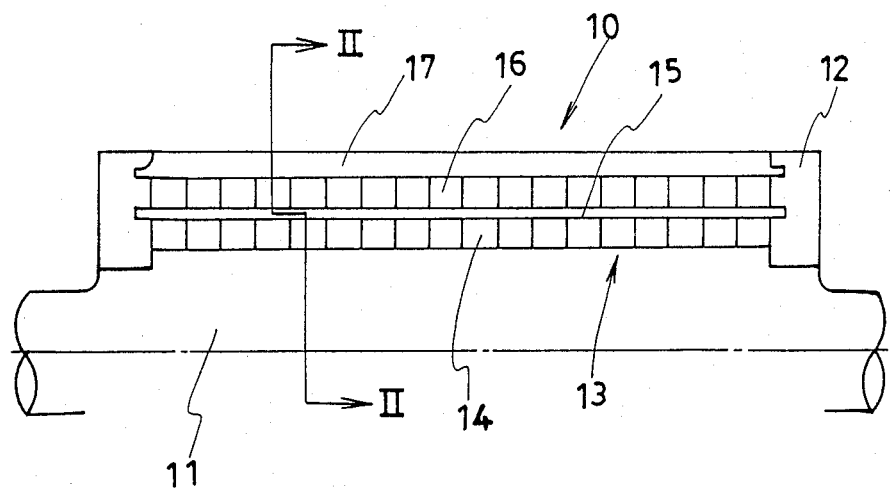
FIG. 1 is a longitudinal view, in partial cross section, through a rotating part according to the present invention.
Figure 2:
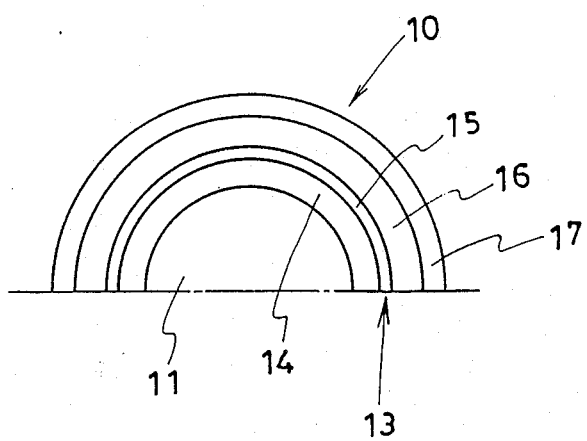
FIG. 2 is a cross-sectional view taken along line II—II of FIG. 1.

With reference to FIGS. 1 and 2, a rotating part 10 is provided for a high speed synchronous generator, which generator also includes a stator (not shown). The rotating part 10 includes a core 11, side walls 12, and an outer circumferential portion 13. The core 11 is made of a magnetic material such as a high strength magnetic alloy. The side walls 12 are made of a high strength nonmagnetic alloy such as a high modulus carbon fiber reinforced plastic material.

The outer circumferential portion 13 includes an inner layer 14, an inner retaining ring 15, an outer layer 16 and an outer retaining ring 17. The layers 14, 16 and rings 15, 17 are radially layered one on top of each other.

Figure 3:
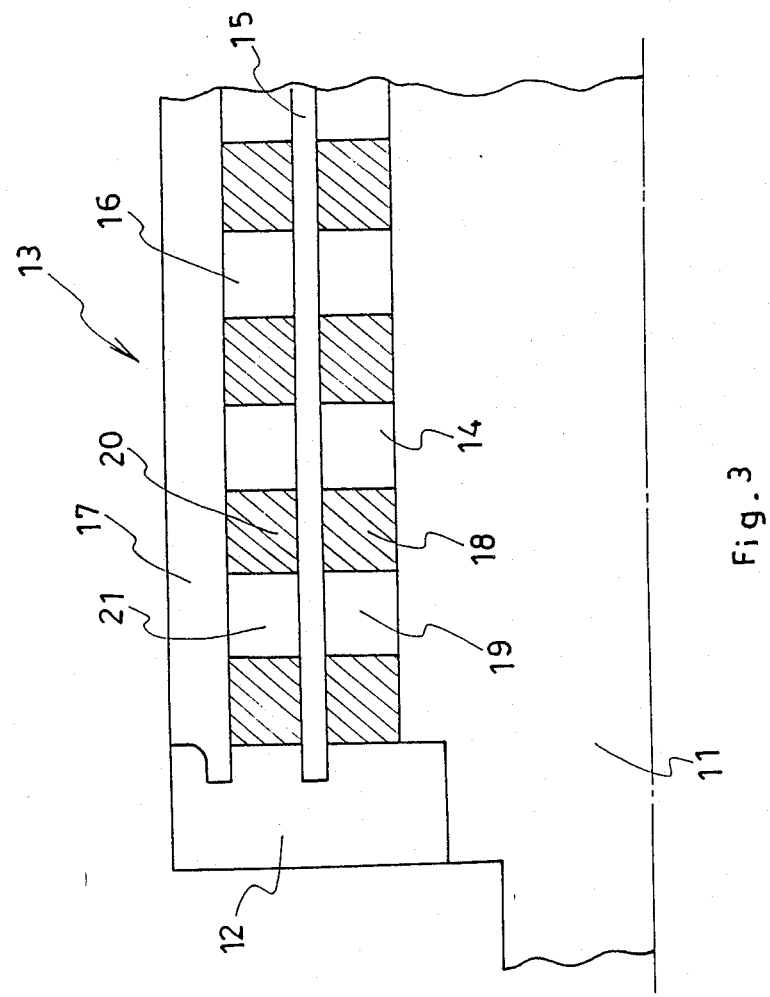
FIG. 3 is an enlarged detail view of an outer circumferential portion of FIG. 1.

As shown in FIG. 3, the inner layer 14 includes a plurality of annular permanent magnet portions 18 and a plurality of annular, light weight, nonmagnetic material portions 19 which are axially alternatively arranged. The permanent magnet portions 18 are made of a high magnetic neodymium-iron-boron magnet, while the light weight, nonmagnetic material portions 19 are made of a high modulus carbon fiber reinforced plastic material.

The inner retaining ring 15 is made of a magnetic material such as a high strength magnetic alloy, and is disposed about the outer circumference of the inner layer 14.

The outer layer 16 includes a plurality of annular permanent magnet portions 20 and a plurality of annular, light weight, nonmagnetic portions 21, which a re made of a high modulus carbon fiber reinforced plastic material. The portions 20 and 21 are axially alternatively arranged in the same way as the inner layer 14. The permanent magnet portions 18 of the inner layer 14 are in radial alignment with the permanent magnet portions 20 of the outer layer 16, and the light weight nonmagnetic portions 19 of the inner layer 14 are in radial alignment with the light weight, nonmagnetic portions 21 of the outer layer 16.

The outer retaining ring 17 is made of a magnetic material such as a high strength magnetic alloy and is disposed about the outer circumference of the outer layer 16. Because the outer retaining ring 17 is exposed, the distance between the magnetic material of the rotating part 10 and the stator can be small, thus improving the efficiency of the generator.

The plastic material of the side walls 12 and the nonmagnetic material portions 19, 21 may be wound circumferentially about the rotating part 10 and fixed by an adhesive.

Upon a high speed rotation of the rotating part 10, each member of the outer circumferential portion 13 is subjected to very high and possibly damaging tensile stresses as a result of centrifugal force. The permanent magnet portions 18 of the inner layer 14 are supported by the inner retaining ring 15, which is supported against the centrifugal force by the light eight nonmagnetic portions 21 of the outer layer 16. The permanent magnet portions 20 of the outer layer 16 are secured by the outer retaining ring 17, which is preferably constructed of a high strength magnetic alloy.

The nonmagnetic material portions 19, 21 of the layers 14, 16 are light weight, so that the centrifugal forces acting on the inner and outer retaining rings 15, 17 are small. In addition, the inner retaining ring 15, which is interposed between the permanent magnet portions 18, 20, is supported by the nonmagnetic portions 21 of the outer layer 16. Thus, dangerous loading and possible damage to the rings 15, 17 is minimized.

Figure 4:
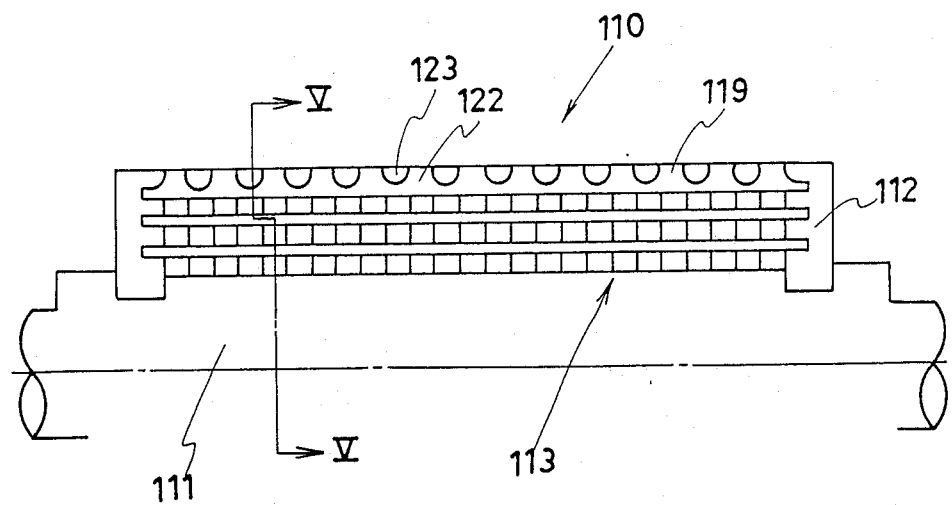
FIG. 4 is a longitudinal view, in partial cross section, through a rotating part according to an alternative preferred embodiment of the present invention.
Figure 5:
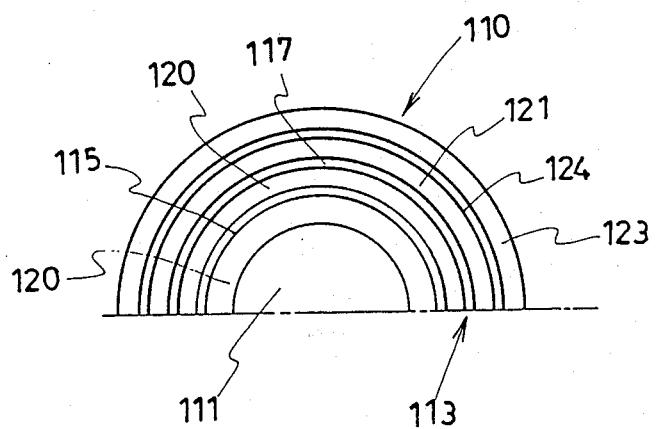
FIG. 5 is a cross-sectional view taken along line V—V of FIG. 4.
Figure 6:
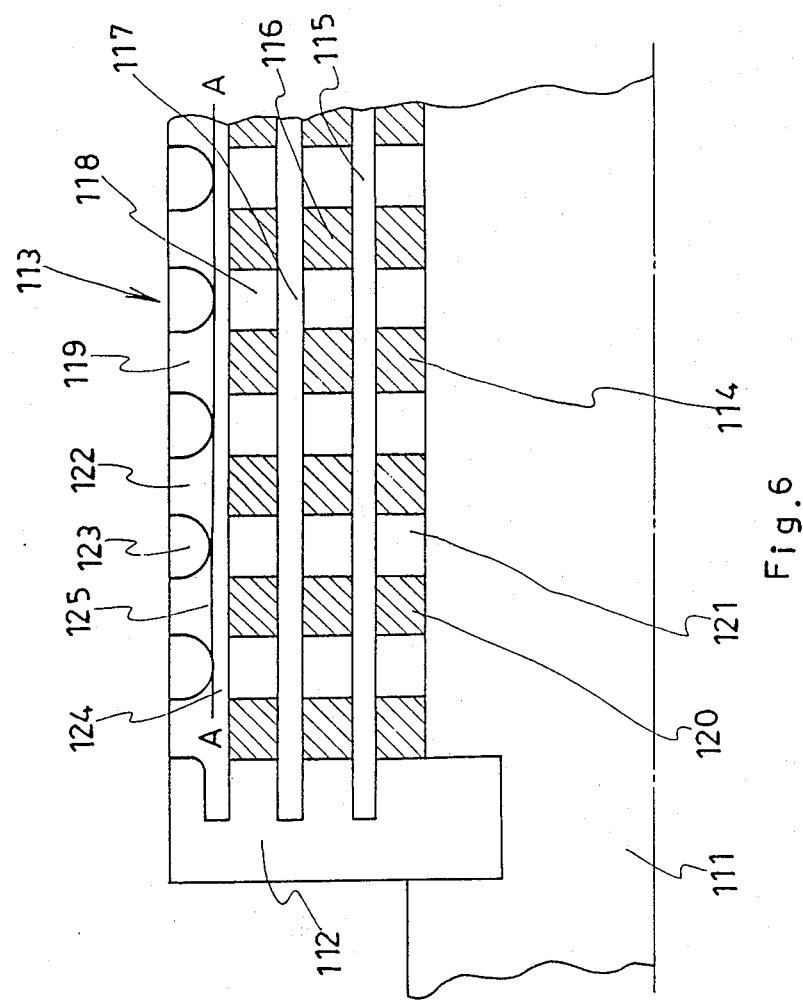
FIG. 6 is an enlarged detail view of an outer circumferential portion of FIG. 4.

A second preferred embodiment of the present invention is illustrated in FIGS. 4–6 and includes a rotating part 110 for a high speed synchronous generator which, like the part 10 of the first preferred embodiment includes a magnetic core 111 and nonmagnetic side walls 112.

The second preferred embodiment further includes an outer circumferential portion 113 that is provided with an inner layer 114, an inner retaining ring 115, a middle layer 116, a middle retaining ring 117, an outer layer 118, and an outer retaining ring 119. Those members are radially layered one on top of each other. All of the layers 114, 116, 118 have the same construction, so only the inner layer 114 is further described in detail.

The inner layer 114 includes a plurality of annular permanent magnet portions 120 and a plurality of annular, light weight, nonmagnetic material portions 121 which are axially alternately arranged. The permanent magnet portions 120 are made of a high magnetic neodymium-iron-boron magnet, and the light weight, nonmagnetic material portions 121 are made of a high modulus carbon fiber reinforced plastic material.

Each retaining ring 115, 117, 119 is preferably constructed of a magnetic material such as a high strength magnetic alloy, and is located on the outer circumference of the corresponding layer 114, 116, 118. The permanent magnet portions 120 and the light-weight, nonmagnetic material portions 121 of each layer 114, 116, 118 are axially located at the same position.

The outermost retaining ring 119 is provided with a magnetic portion 122 and a plurality of circumferential recesses 123. The magnetic portion 122 is made of a high magnetic neodymium-iron-boron magnet and the recesses 123 are filled with a light weight, high strength, nonmagnetic material such as a high modulus carbon fiber reinforced plastic material. The plastic material is circumferentially wound into the recesses 123 and is fixed therein by an adhesive.

The core 111, the side wall 112, and the outer circumferential portion 113 are integrally constructed as a rotor such that magnetic material is thus exposed at the magnetic portion 122 of the outermost retaining ring 119.

The inner retaining ring 115 is interposed between the permanent magnet portions 120 of the inner and middle layers 114, 116, and is supported by the nonmagnetic portions 121 of the middle layer 116, so the centrifugal forces of the permanent magnet portions 120 of the inner layer 114 do not act on the permanent magnet portions 120 of the middle layer 116 and the middle retaining ring 117. Similarly the middle retaining ring 117 is interposed between the permanent magnet portions 120 of the middle and outer layers 116, 118, and is supported by the nonmagnetic portions 121 of the outer layer 118, so the centrifugal forces of the permanent magnet portions 120 of the middle layer 116 do not act on the permanent magnet portions 120 of the outer layer 118 and the outer retaining ring 119.

Therefore, the permanent magnet portions 120 of each layer 114, 116, 118 are supported by the corresponding retaining rings 115, 117, 119, and the retaining rings 115, 117, 119 are supported by the light-weight nonmagnetic material portions 121 of the layers 116, 118 and by the nonmagnetic material 123. Furthermore, the nonmagnetic material portions 121 of each layer 114, 116, 118 are light weight, to further minimize the centrifugal forces acting on each retaining ring 115, 117, 119.

The outer ring 119 may be subjected to high and possibly damaging tensile stresses at a point where the tensile stresses caused by the centrifugal forces exceed the ultimate strength of the material. A critical point is shown by a line A—A in FIG. 6. A lower part 124 of the magnetic portion 122 is located at an inner radial side of the recesses 123 and is supported by the plastic material in the recesses 123. Because the plastic material wound in the recesses 123 resists the centrifugal force, an intermediate part 125 of the magnetic portion 122 is supported between the recesses 123. The plastic material bears on the recesses 123, and acts on the line A—A in the intermediate part 125 because the shape of the recesses 123 is smoothly rounded in the inner radial direction in the shape of "U", as illustrated in FIG. 6.

More than one recess 123 is not always required. The number of recesses depends on the particular application of the rotating part 110.

Accordingly, although upon high speed rotation of the rotating part 110, each member of the outer circumferential portion 113 is subjected to centrifugal forces causing high and possibly damaging tensile stresses, dangerous loading and possible damage to the retaining rings 115, 117, 119 is avoided.

Because a portion of the outer retaining ring 119 that is made of magnetic material is exposed, the distance between the magnetic material of the rotating part 110 and the stator can be small, thus increasing the efficiency of the generator.

Figure 7:
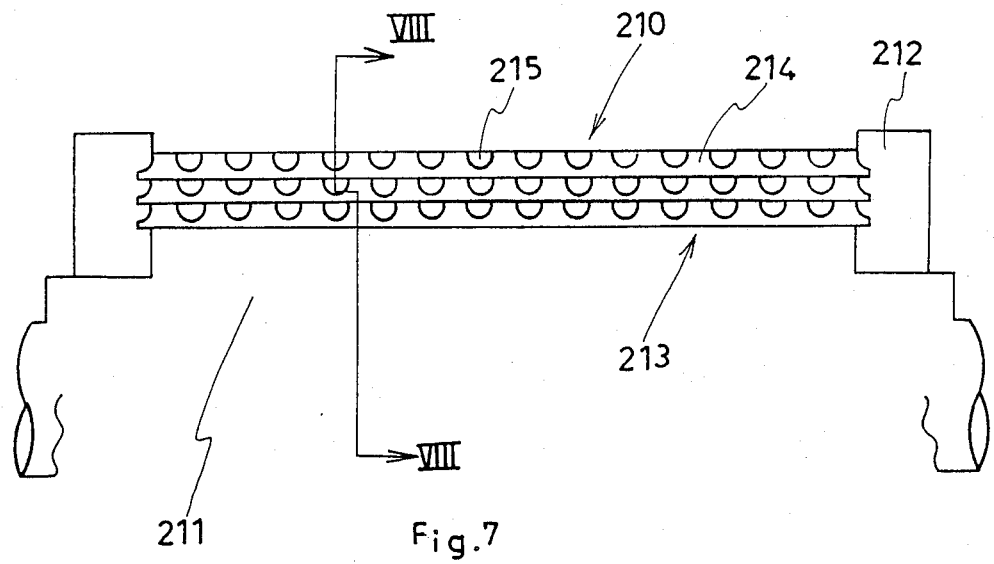
FIG. 7 is a longitudinal view, in partial cross section, through a rotating part according to another alternative preferred embodiment of the present invention.
Figure 8:
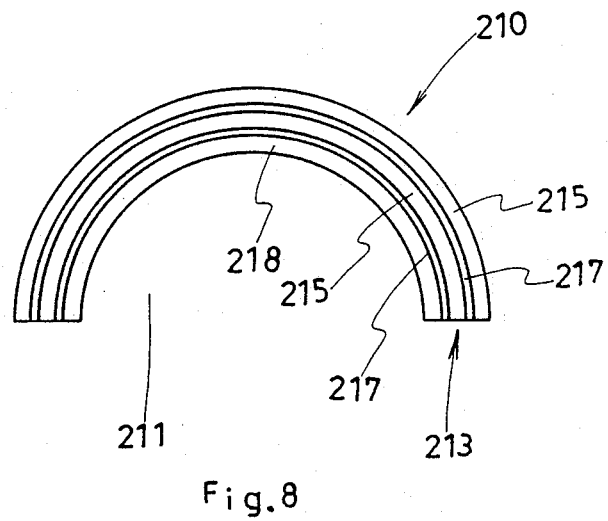
FIG. 8 is a cross-sectional view taken along line VIII—VIII of FIG. 7.
Figure 9:
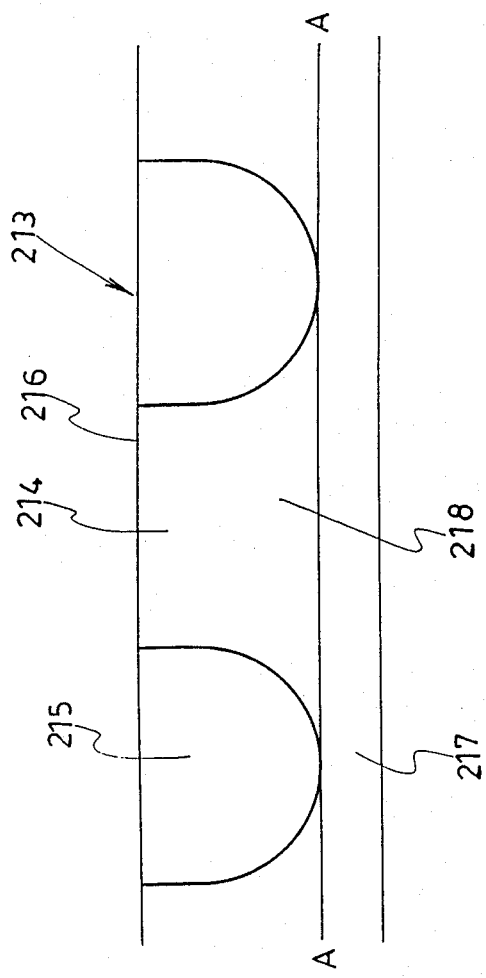
FIG. 9 is a enlarged detail view of an outer circumferential portion of FIG. 7.

A third preferred embodiment is disclosed in FIGS. 7–9. The rotating part 210 of the third preferred embodiment includes a magnetic core 211 and nonmagnetic side walls 212, similar to those of the first two preferred embodiments. The rotating part 210 further includes an outer circumferential portion 213 having an annular magnetic portion 214 which has a plurality of circumferential recesses 215 therein. The magnetic portion 214 is made of a high magnetic neodymium-iron-boron magnet and the recesses 215 are filled with a light weight, high strength, nonmagnetic material such as a high modulus carbon fiber reinforced plastic material. The plastic material may be circumferentially wound about the magnetic portion 214 and is fixed therein by an adhesive.

The core 211, the side walls 212 and the outer circumferential portion 213 are integrally constructed as a rotor such that a portion of permanent magnetic material is exposed at an outer portion 216 of the magnetic portion 214.

The recesses 215, which contain a light weight, high strength, nonmagnetic material have a suitable shape for supporting the magnetic portion 214 against centrifugal forces. A critical point is shown by a line A—A in FIG. 9. A lower part 217 of the magnetic portion 214 is located at an inner radial side of the recesses 215 and is supported against centrifugal forces by the plastic material in the recesses 215. The plastic material in the recesses 215 bears on the recesses 215 on the line A—A and thus also provides support for an intermediate part 218 of the magnetic portion 214 because the shape of the recesses 215 is smoothly rounded in the inner radial direction in a U-shape, as illustrated in FIG. 9.

More than one circumferential recess 215 is not always required in the magnetic portion 214. The number of recesses depends on the particular application of the rotating part 210.

The outer circumferential portion 213 may comprise a plurality of layers of magnetic portions 214, wherein the depth of the recesses 215 in each layer can be determined by the desired position of the critical point. If a plurality of such layers are provided, the magnetic portion 214 of each layer should preferably be axially located at the same position.

Figure 10:
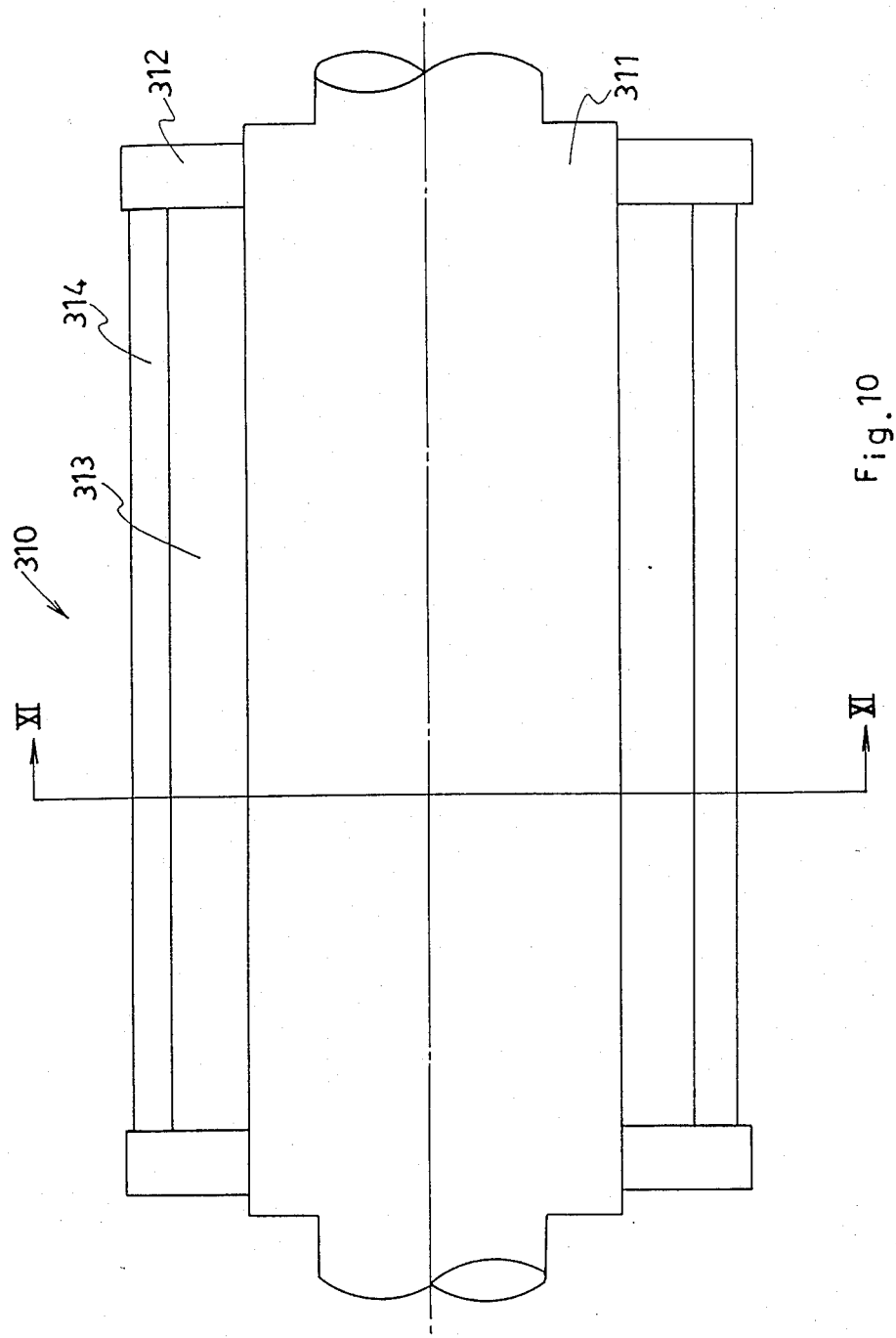
FIG. 10 is a longitudinal view of a part according to another alternative preferred embodiment of the present invention.
Figure 11:
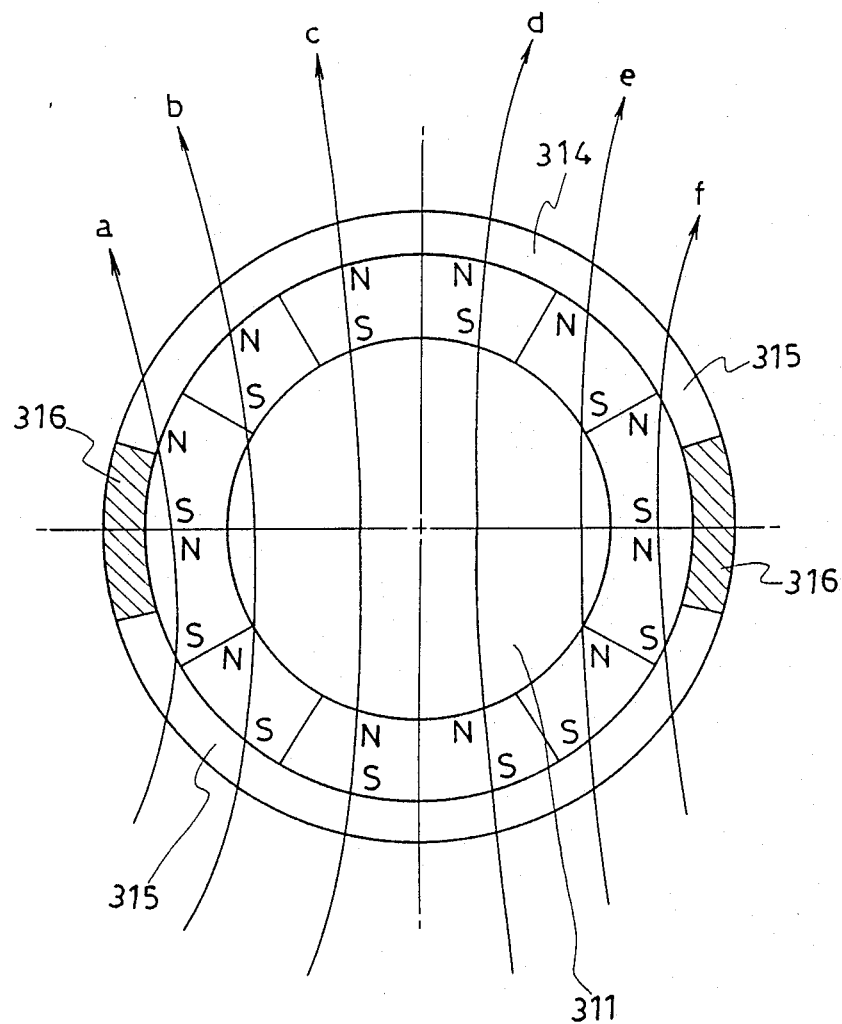
FIG. 11 is a cross-sectional view taken along line XI—XI of FIG. 10.
Figure 12:
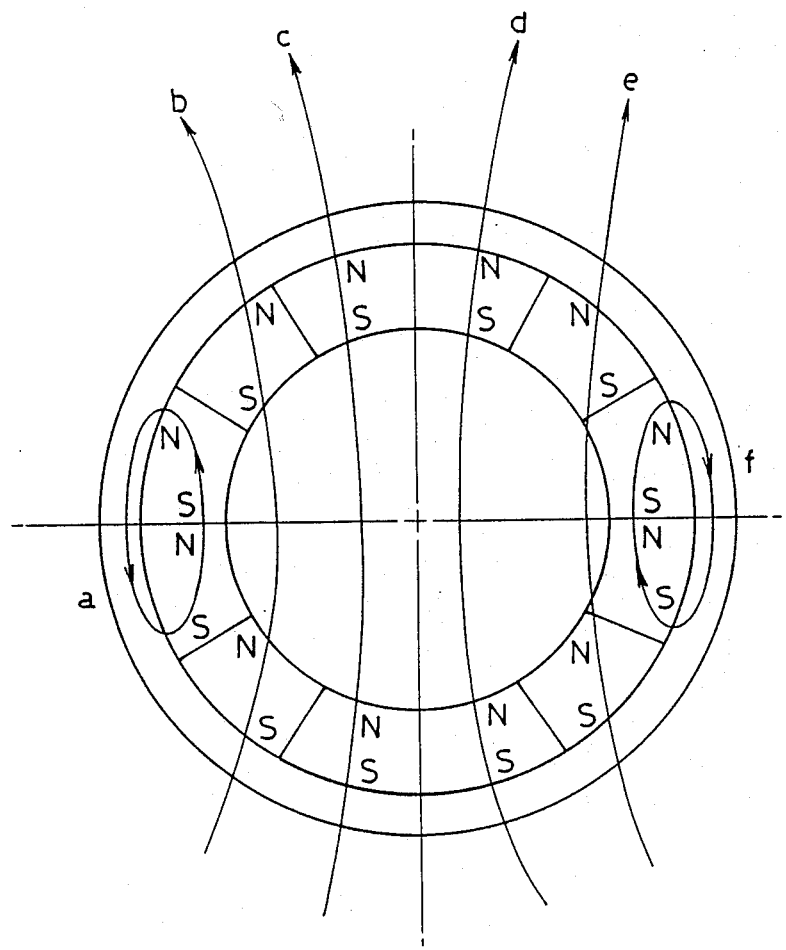
FIG. 12 is a view illustrating the magnetic flux in an embodiment different from the embodiment shown in FIG. 11.

A fourth preferred embodiment of the present invention is disclosed in FIGS. 10–12. That embodiment also includes a rotating part 310 for a high speed generator. The part 310 further includes a magnetic core 311 and nonmagnetic side walls 312, as in the first three preferred embodiments.

The rotating part 310 further includes a magnetic portion 313 that comprises a plurality of permanent magnet sections made of a material such as a high magnetic neodymium-iron-boron, and which has positive and negative poles as shown in FIG. 11. A retaining ring 314 is circumferentially mounted on the magnetic portion 313 and is divided into two parts 315, 316, of which a first part 315 is magnetic and a second part 316 is nonmagnetic. The first part 315 includes two sections arranged diametrically opposite each other, and the second part 316 includes two sections, also mounted diametrically opposite each other.

The first part 315 can be made by selectively treating a portion of a ring shaped, nonmagnetic material with heat, or by treating the whole with heat and selectively changing the speed of the heat treatment. Alternatively, it is possible to treat selectively an originally magnetic material with heat and change the speed of the heat treatment so as to partially demagnetize a portion of it. Another wa is separately to produce the materials for the magnetic and nonmagnetic parts, and then to join them together by welding, for example.

During a high speed rotation of the rotating part 310, the annular magnetic portion 313 is protected from damage from centrifugal forces by the retaining ring 314.

Because the second part 316 of the retaining ring 314 is made of nonmagnetic material, the magnetic flux does not pass therethrough, thus enabling a high output of electric power. If the whole retaining ring 314 is magnetic, as shown for comparison in FIG. 12, the magnetic flux passes through the retaining rings 314, in such a manner as to lower the efficiency of the generation of electric power. Alternatively, if the whole retaining ring 314 is made of a nonmagnetic material, the distance between the permanent magnetic portion 313 and the stator would be large, thus also lowering the output of generated electric power.

While this invention has been illustrated and described in accordance with preferred embodiments, it is recognized that variations and changes may be made therein without departing from the invention as set forth in the claims.

What is claimed is:

1. A rotating part for a dynamo-electric machine, comprising:
    a core portion of magnetic material;
    an annular permanent magnet surrounding said core portion, said annular permanent magnet includes a plurality of annular permanent magnet rings separated axially by nonmagnetic rings;
    an annular retaining ring of magnetic material for securing the annular permanent magnet; and
    a side wall made of a nonmagnetic material adjacent said annular permanent magnet.

2. The rotating part according to claim 1, further comprising a plurality of layers of permanent magnet rings.

3. The rotating part according to claim 2, further comprising a retaining ring of magnetic material for each such layer.

4. The rotating part according to claim 2, wherein the nonmagnetic rings are equidistantly spaced along the axis of the rotating part.

5. The rotating part according to claim 1, wherein the retaining ring is made from a high strength magnetic alloy.

6. A rotating part for a dynamo-electric machine, comprising:
    an annular permanent magnet;
    an annular retaining ring of magnetic material for securing the annular permanent magnet, the retaining ring having an outer circumferential recess therein; and a nonmagnetic material disposed in the recess for securing the ring against centrifugal forces.

7. The rotating part according to claim 6, further comprising:
   a core portion made of magnetic material inside the annular permanent magnet; and
   side wall portions made of a nonmagnetic material adjacent said annular permanent magnet.

8. The rotating part according to claim 6, wherein the annular permanent magnet includes a plurality of permanent magnet rings separated axially by nonmagnetic rings.

9. The rotating part according to claim 8, further comprising a plurality of layers of permanent magnet rings.

10. The rotating part according to claim 9, further comprising a retaining ring of magnetic material for each such layer.

11. The rotating part according to claim 9, wherein the nonmagnetic rings are equidistantly spaced along the axis of the rotating part.

12. The rotating part according to claim 6, wherein the retaining ring is made from a high strength magnetic alloy.

13. A rotating part for a dynamo-electric machine, comprising:
   a core portion of magnetic material;
   a first annular permanent magnet having a plurality of outer circumferential recesses therein, said first annular permanent magnet surrounding said core portion;
   a nonmagnetic material disposed in each of the recesses for securing the first annular permanent magnet against centrifugal forces; and
   side wall portions made of a nonmagnetic material adjacent said first annular permanent magnet.

14. The rotating part according to claim 13, further comprising a second annular permanent magnet concentrically disposed about said first annular permanent magnet.

15. The rotating part according to claim 14, wherein said second annular permanent magnet includes an outer circumferential recess therein and a nonmagnetic material disposed in the recess of said second annular permanent magnet.

16. A rotating part for a dynamo-electric machine, comprising:
   an annular magnetic portion comprising a plurality of permanent magnet sections, the polarity of each of said permanent magnet sections being aligned in substantially the same direction; and
   an annular retaining ring disposed about said annular magnetic portion, said retaining ring including two diametrically opposed magnetic portions and two diametrically opposed nonmagnetic portions.

17. The rotating part according to claim 16, wherein the outer periphery of a first half of the annular magnetic portion has a first polarity and the outer periphery of a second half of the annular magnetic portion has a second polarity.

18. The rotating part according to claim 17, wherein said nonmagnetic portions of the retaining ring are arranged at the junctions of the first and second halves of the annular magnetic portion.

* * * * *